United States Patent [19]

Mangels et al.

[11] Patent Number: 4,562,041

[45] Date of Patent: Dec. 31, 1985

[54] METHOD OF REDUCING THE GREEN DENSITY OF A SLIP CAST ARTICLE

[75] Inventors: John A. Mangels, Flat Rock; Ray A. Dickie, Birmingham, both of Mich.

[73] Assignee: Ford Motor Company, Dearborn, Mich.

[21] Appl. No.: 512,094

[22] Filed: Jul. 8, 1983

[51] Int. Cl.$^4$ ................................................. B22F 1/00
[52] U.S. Cl. ...................................................... 419/40
[58] Field of Search .......................................... 419/40

[56] References Cited

U.S. PATENT DOCUMENTS

| | | | |
|---|---|---|---|
| 3,322,536 | 5/1967 | Stoddard et al. | 419/40 |
| 3,489,555 | 1/1970 | Thellmann | 419/40 |
| 4,112,143 | 9/1978 | Adlerborn et al. | 419/44 |
| 4,229,217 | 10/1980 | Haehn | 419/13 |

*Primary Examiner*—Herbert S. Cockeram
*Attorney, Agent, or Firm*—William E. Johnson; Clifford L. Sadler

[57] ABSTRACT

The method disclosed in this specification is one of reducing the green density of an article cast in a slip casting operation. The article is cast from a casting slip containing silicon metal particles, yttrium containing particles, and a small amount of a fluoride salt which is effective to suppress flocculation of the silicon metal particles by $y^{+3}$ ions derived from the yttrium containing particles. The method is characterized by the following step. A small amount of compound which produces a cation which will partly flocculate the particles of silicon metal is added to the casting slip. The small amount of this compound is added so that when the casting slip is slip cast into a casting mold, the partly flocculated particles of silicon will interrupt an otherwise orderly packing of the particles of silicon and particles of yttrium. In this manner, the green density of the slip cast article is reduced and the article may be more easily nitrided.

8 Claims, No Drawings

METHOD OF REDUCING THE GREEN DENSITY OF A SLIP CAST ARTICLE

STATEMENT

The invention herein described was made in the course of or under a contract or subcontract thereunder with NASA—Contract No. DEN3-167, Subcontract P1928150.

BACKGROUND ART AND PRIOR ART STATEMENT

No search was conducted on the subject matter of this specification in the U.S. Patent and Trademark Office or any other search facility. We are unaware of any prior art which is relevant to the method of reducing the green density of a slip cast article as disclosed and claimed in this specification.

Silicon metal particles and yttrium containing particles have been mixed and formed into slips so that articles may be slip cast therefrom. The purpose of using silicon particles is that these particles may be subsequently nitrided in order to form silicon nitride, a ceramic material which has excellent thermal resistance properties. Yttrium is used in casting such articles because the yttrium serves as an excellent sintering aid in a sintering operation carried out on the formed article once the silicon particles have been transformed into silicon nitride. Thus, the order of progress is one in which an article is slip cast, the so-formed article being formed of silicon particles and yttrium containing particles. The so-formed article is then subjected to a nitriding operation in which the silicon particles are transformed into silicon nitride. Thereafter, the nitrided article is subjected to a sintering operation in which the yttrium acts as a sintering aid in permitting the silicon nitride particles to form into a uniformly high density silicon nitride article having excellent thermal resistance characteristics. The arts of slip casting, nitriding, and sintering are all well known in the art and no further discussion thereof will be contained herein.

One difficulty we have had in forming slips of silicon metal particles and yttrium containing particles comes about in that the slips generally have a relatively poor stability when slip cast as well as a relatively short shelf life. By poor stability we mean that the formed slip does not have uniform chemical and rheological stability for prolonged periods of time necessary to cast articles having some degree of thickness. In fact, we have found that slips of silicon metal particles and yttrium containing particles are relatively unstable and generally have a very short period of time in which they may be slip cast, the time in some instances being only one-half hour to one hour. In most cases a minimum of 4–8 hours of a stable slip is required in order to cast that slip in a slip casting process to form an acceptable slip cast part. By poor shelf life we mean that chemical properties of the slip change as the slip sits on a shelf between times of using the slip in a casting operation.

In general, the yttrium containing particles forming the yttrium containing sintering aid are formed from a compound which has at least some solubility in water to form $Y^{+3}$ ions. These $Y^{+3}$ ions have a high potential for totally flocculating the silicon metal particles into a semiporous solid. Thus, in a situation where yttrium containing particles are mixed with silicon metal particles to form a slip, the yttrium containing particles normally dissolve in water to form the $Y^{+3}$ ions. Once a significant number of these ions have formed, the ions are effective to totally flocculate the silicon metal particles into a semiporous solid which in effect sets up the material which is to be used as the casting slip and thereby ends the castability of that slip. The concentration of the yttrium containing particles in the slip determines the amount of time before the flocculation of the silicon particles takes place. In any reqard, the flocculation of slip compositions we use containing silicon metal particles and yttrium containing particles usually occurs within one-half to one hour after that slip has been cast into a mold. This time is too short to cast an article having other than a very small thickness dimension.

In an application entitled "Method of Forming A Relatively Stable Slip of Silicon Metal Particles and Yttrium Containing Particles", U.S. Ser. No. 512,095, filed on even date herewith, we described a method by which a fluoride salt was added to the casting slip to render $Y^{+3}$ ions ineffective in flocculating silicon metal particles. The slip which resulted from this teachings of the method of our other application was one that would produce a green slip cast article having a green density of about 1.60 g/cc with a packing fraction of about 0.65 to 1.70 g/cc with a packing fraction of about 0.69. At this particular green density, the ability to nitride the finished article was such that normally it was difficult to nitride relatively thick sections of the cast article.

We determined that it would be best to have a green density in the range of 1.42 to 1.55 with a packing fraction in a range of 0.58 to 0.63 if one desired to manufacture thick sections of a nitrided material. The lower green density permitted better penetration of the green body for the purpose of nitriding the same.

It is therefore a principal object of the method of this invention to provide a method of reducing the green density of an article cast in a slip casting operation whereby the article is thereby easier to nitride in a subsequent nitriding operation.

DISCLOSURE OF THE INVENTION

This invention is directed to a method of reducing the green density of an article cast in a slip casting operation and more particularly to a method of reducing the green density of an article cast in a slip casting operation from a casting slip containing silicon metal particles, yttrium containing particles, and a small amount of a fluoride salt which is effective to suppress flocculation of the silicon metal particles by $Y^{+3}$ ions derived from the yttrium containing particles. The method is characterized by the following step.

A small amount of a compound which produces a cation which will partially flocculate the particles of silicon metal is added to the casting slip. The small amount of this type of compound is added to the casting slip so that when the slip is cast into a casting mold the partly flocculated particles of silicon will interrupt an otherwise orderly packing of particles of silicon and particles of yttrium. With the packing order interrupted, the green density of the slip cast article is reduced and the article may be more easily nitrided.

In accordance with a preferred but not limiting embodiment of the method of this invention, the green density of a slip cast article cast from silicon particles and yttrium particles is reduced from a green density of about 1.60 to 1.70 g/cc with a packing fraction of about 0.65 to 0.69 to a green density in a range from about 1.42 to 1.55 g/cc with a packing fraction in a range of 0.58 to 0.63.

In accordance with still preferred but not limiting teachings of the method of this invention, monovalent, divalent, or trivalent cationic salts, or any combination thereof, may be added as the compound which produces a cation which will partially flocculate the particles of silicon metal.

BEST MODE AND INDUSTRIAL APPLICABILITY

The novel features that are considered characteristic of the invention are set forth with particularity in the appended claims. The invention itself, however, both as to its organization and method of operation, together with additional objects and advantages thereof, will best be understood from the following description of specific embodiments of the method of our invention.

The following description is what we consider to be preferred embodiments of our method of reducing the green density of an article cast in a slip casting operation. The following description also sets forth what we now contemplate to be the best mode of carrying out the method of this invention. This description is not intended to be a limitation upon the broad principles of the method of this invention which is to be disclosed hereinbelow.

EXAMPLE 1

This example is directed to a method of reducing the green density of an article cast in a slip casting operation. The method is characterized in that it has the following steps.

A casting slip of silicon metal particles is formed in water. Preferably the silicon metal particles used have a size range of less than 10 microns. The silicon metal particles are dispersed in water to form the casting slip by use of a dispersing agent such as monoethanolamine. Normally the silicon metal particles form approximately 88% by weight of the material dispersed in the water. However, the silicon metal particles may form 95.5–77% by weight of the total weight of the particles dispersed in the water. In general, for every 100 parts by weight of dispersed particles there are 40–45 parts by weight of water to form the casting slip.

Particles of an yttrium-containing sintering aid are added to the casting slip. In the preferred embodiment, the particles of yttrium containing sintering aid are a compound which has at least some solubility in water to form $Y^{+3}$ ions. The yttrium containing sintering aid has a size range of less than about five microns and normally makes up about 12% by weight of the weight of the particles dispersed in the water. However, the yttrium containing sintering aid may make up 4.5–23% by weight of the particles dispersed in the water. A preferred yttrium containing sintering aid is yttrium oxide.

The $Y^{+3}$ ions produced by the yttrium containing sintering aid dissolving in water have a high potential for totally flocculating the silicon metal particles of the slip into a semiporous solid. By this we mean that for slip compositions which we make, if the composition is allowed to stand for a period of time, generally from about 30 minutes to one hour, the yttrium sintering aid will dissolve enough $Y^{+3}$ ions into the water to cause a flocculation of the silicon metal particles into a semiporous solid. In essence, the casting slip sets up into a semiporous material and is thereby ruined. In other words, the casting slip is no good for carrying out a slip casting operation.

In order to prevent the flocculation of the silicon metal particles by the $Y^{+3}$ ions, we have found that if a small amount of a fluoride salt is added to the casting slip, the $Y^{+3}$ ions are rendered ineffective in flocculating the silicon metal particles. By this we mean that the silicon metal particles as well as particles of the yttrium containing sintering aid remain in suspension in the casting slip and the casting slip has an increased shelf life. The casting slip may, for example, have no changes in its chemical or rheological stability for up to 350 hours or more, which is a very good shelf life for such a casting slip.

Preferably we desire to use a monovalent cation for the fluoride salt such as ammonia or sodium. Divalent and trivalent cations may be used, but they are not as effective in suppressing the flocculation by the $Y^{+3}$ ions as is the monovalent cation fluoride salt. Normally the fluoride salt is used in an amount of 0.01–0.25% by weight of the total weight of particles in suspension.

Normally the pH of the casting slip is in a range of 7.5–9. The pH of the casting slip is maintained in this range by the addition of acid or base, if required. By maintaining the pH, the extended shelf life of the casting slip is guaranteed. The casting slip of this invention can be used in a slip casting operation to produce a slip cast part having a relatively thick cross-section.

We do not know exactly the mechanism by which the small amount of fluoride salt is effective to suppress the flocculation of the silicon particles, but we believe that the principal mechanism is one in which $YF_3$ is formed on the surfaces of individual particles of the yttrium compound thus inhibiting the formation of $Y^{+3}$ ions in the water.

If the casting slip described above was now slip cast into a suitable mold, it would form a slip cast article whose green density would be about 1.60–1.70 g/cc with a packing fraction of about 0.65 to 0.69. If the slip cast article has a relatively thick cross-section, for example, more than ½–1 inch, it may be difficult to entirely nitride the green body in a nitriding operation because of the difficulty of penetrating the body with nitriding gas. However, if the green density of the body is lowered to a green density in a range of 1.42 to 1.55, which has a packing function of 0.58 to 0.63, then thick sections (about 2–4 inches) of the body may be easily nitrided in a nitriding operation.

The method of this invention is one in which a small amount of a compound is added to the casting slip. The compound is one which produces a cation which will partially flocculate the particles of silicon metal in the casting slip. In this manner, when the casting is slip cast into a casting mold, the partly flocculated particles of silicon will interrupt an otherwise orderly packing of the particles of silicon and particles of yttrium. In this manner, the green density of the slip cast article is reduced and the article may be more easily nitrided.

By interrupting the orderly packing of the particles, the packing fraction is lowered from about 0.65 to 0.69 to a packing fraction in the range from 0.58 to 0.63. The compound which may be added is one whose fluoride salt is at least partially soluble in water and includes monovalent, divalent, and trivalent cationic salts. When such salts are introduced into the slip, the fluoride already present may react with the cation to form a fluoride salt thereof, but so long as that fluoride salt is at least partially soluble, some of the ions will be available to act to partly flocculate the particles of silicon metal.

We prefer to use the monovalent cationic salts in this process with the divalent and trivalent salt being usable but certainly not preferred. Our preferred monovalent cationic salt is sodium chloride, preferred divalent cationic salt is barium acetate, and the preferred trivalent cationic salt is ferric chloride. The cationic salt is used preferably in a range from 0.01 to 0.20% by weight of the total weight of particles in the slip. The type of salt and concentration level employed are effective in determining how much of the silicon metal particles will be flocculated. The monovalent material will cause less flocculation per unit concentration than the divalent or trivalent cationic salts. Similarly, greater concentrations of the same material will cause greater degrees of flocculation of the particles of silicon metal.

In accordance with the teachings of this preferred method, 0.15% by weight of sodium chloride was added to the slip and the slip cast into an article. The resulting article had a green density of 1.46 g/cc with a packing fraction of 0.59. A 3.5 inch thick sample of this cast material was nitrided in a nitriding operation to produce a final silicon nitride article having a density of 2.25 g/cc.

EXAMPLE 2

This example is directed to a method of reducing the green density of an article cast in a slip casting operation and is characterized in the following steps.

Basically the same general operating parameters as discussed in Example 1 are in effect in this example.

A casting slip of silicon metal particles is formed in water as described in Example 1. In this example, however, a small amount of fluoride salt is added to the casting slip prior to the addition thereof of the yttrium containing sintering aid. The amount and purpose of the fluoride salt is the same as discussed in Example 1 with the monovalent fluoride salt being preferred.

Thereafter, the yttrium containing sintering aid is added to the fluoride anion containing casting slip. As described above, the yttrium containing sintering aid is a compound which has at least some solubility in water to form $Y^{+3}$ ions. As mentioned above, the $Y^{+3}$ ions have a high potential for totally flocculating the silicon metal particles into a semiporous solid. However, the small amount of the fluoride anions is effective to suppress the flocculation of the silicon metal particles so that the silicon metal particles as well as the particles of the yttrium containing sintering aid remain in suspension. Since all of the particles remain in suspension, the casting slip has both an increased shelf life and can be used to cast slip cast parts of relatively thick dimension. The pH of the casting slip is maintained in a range from 7.5 to 9.

In order to illustrate the method of this invention, 0.05% by weight of the total weight of the solid in the casting slip of barium acetate was added to the casting slip. A sample cast from this casting slip produced a slip cast article having a green density of 1.58 g/cc and a packing fraction of 0.64. When this green density article was subjected to a nitriding operation, the nitriding operation was successful to nitride the thick section of material to a uniform density of 2.43 g/cc.

EXAMPLE 3

This example is directed to a method of reducing the green density of an article cast in a slip casting operation, and is characterized in the following steps.

Basically the same general operating parameters as discussed in Example 1 are in effect in this example.

A casting slip of silicon metal particles is formed in water as described in Example 1.

In this example, however, a small amount of fluoride salt is added to a solution containing the yttrium containing sintering aid. The amount and purpose of the fluoride salt is the same as discussed in Example 1 with the monovalent fluoride salt being preferred.

The solution of the yttrium containing sintering aid having the fluoride anion therein is then added to the casting slip. As described above, the yttrium containing sintering aid is a compound which has at least some solubility in water to form $Y^{+3}$ ions. As mentioned above, the $Y^{+3}$ ions have a high potential for totally flocculating the silicon metal particles into a semiporous solid. However, the small amount of the fluoride anions is effective to suppress the flocculation of the silicon metal particles so that the silicon metal particles as well as the particles of the yttrium containing sintering aid remain in suspension. Since all of the particles remain in suspension, the casting slip has both an increased shelf life and can be used to cast slip cast parts of relatively thick dimension. The pH of the casting slip is maintained in a range from 7.5 to 9.

To the above identified casting slip there was added 0.035% by weight of the weight of the particles in the slip of ferric chloride. A sample was then slip cast from this slip, the sample having a thickness of 3.5 inches. The green density of the slip cast article was 1.50 g/cc and it had a packing fraction of 0.61. When this article was nitrided, it was uniformly nitrided throughout its cross-sectional area to produce a final article having a density of 2.32 g/cc.

While particular embodiments of the invention have been illustrated and described, it will be obvious to those skilled in the art that various changes and modifications may be made without departing from the invention, and it is intended in the appended claims all such modifications and equivalents as fall within the true spirit and scope of this invention.

We claim:

1. A method of reducing the green density of an article cast in a slip casting operation from a casting slip containing silicon metal particles, yttrium containing particles, and a small amount of a fluoride salt which is effective to suppress flocculation of the silicon metal particles by $Y^{+3}$ ions derived from the yttrium containing particles;

said method characterized by the step of:
adding to the casting slip a small amount of a compound which will produce a cation which will partly flocculate the particles of silicon metal so that when the casting slip is cast into a casting mold, said partly flocculated particles of silicon will interrupt an otherwise orderly packing of the particles of silicon and particles of yttrium, whereby the green density of the slip cast article is reduced and said article may be more easily nitrided.

2. The method of claim 1, wherein said small amount of compound which will partly flocculate the particles of silicon metal is present in said casting slip in a range from 0.01 to 0.20% by weight of the total weight of particles in said casting slip.

3. The method of claim 2, wherein said small amount of flocculating compound is a monovalent cationic salt.

4. The method of claim 3, wherein said monovalent cationic salt is sodium chloride.

5. The method of claim 2, wherein said small amount of flocculating compound is a divalent cationic salt.

6. The method of claim 5, wherein said divalent cationic salt is barium acetate.

7. The method of claim 2, wherein said small amount of flocculating compound is a trivalent cationic salt.

8. The method of claim 7, wherein said trivalent cationic salt is ferric chloride.

* * * * *